Patented Apr. 30, 1946

2,399,362

UNITED STATES PATENT OFFICE 2,399,362

PREPARATION OF VITAMIN INTERMEDIATE

Elmer J. Lawson and Hervey C. Parke, Detroit, Mich., assignors to Parke, Davis & Company, Detroit, Mich., a corporation of Michigan No Drawing. Original application August 18, 1941, Serial No. 407,358. Divided and this application May 11, 1942, Serial No. 442,536

3 Claims. (Cl. 260—344)

The invention relates to the preparation of certain chemical compounds useful as intermediates in the preparation of pantothenic acid, a vitamin of the B complex, and derivatives thereof.

This application is a division of our co-pending application, Serial No. 407,358, filed August 18, 1941.

More particularly this application relates to an improved process for the preparation of $\alpha$-hydroxy-$\beta,\beta$-dimethyl-$\gamma$-butyrolactone.

Our process comprises the steps of condensing isobutyraldehyde and formaldehyde in the presence of a water-soluble cyanide, reacting the formoisobutyraldol thus formed with a water-soluble cyanide in the presence of a water-soluble bisulfite and hydrolyzing the resulting formoisobutyraldol cyanohydrin. Water-soluble cyanides and bisulfite suitable for use in this reaction include the cyanides and bisulfite of the alkali metals such as sodium, potassium, or lithium, and those of the alkaline earth metals such as calcium and barium. However there may be used any other water-soluble cyanides or bisulfites. The hydrolysis may be achieved in any manner, including hydrolysis with alkaline reagents such as calcium hydroxide, sodium carbonate, or sodium hydroxide. However, we prefer to use acidic hydrolyzing agents, especially mineral acids such as sulphuric acid or hydrochloric acid. After the hydrolysis is complete, we isolate the $\alpha$-hydroxy-$\beta,\beta$-dimethyl-$\gamma$-butyrolactone by an improved process which comprises evaporating the aqueous hydrolysate substantially to dryness, i. e., until substantially water free, extracting the residue with an inert solvent such as acetone or dioxane and isolating the lactone from the extract by distillation, the lactone being obtained as a fraction of boiling point approximately 120–128° C. at 14 millimeters pressure.

In the above extraction, solvents other than acetone or dioxane may be used, such as ethanol, methanol, ethyl methyl ketone, pyridine, benzene, or other solvents which do not react appreciably with the lactone and which are readily separated from it by distillation.

The invention may be further illustrated by the following example:

A mixture of 144 g. of isobutyraldehyde and 150 cc. of 40% formalin is cooled to 10° C. and stirred vigorously while a solution of 137 g. of potassium cyanide in 260 cc. of water is added at such a rate that the temperature does not exceed 20° C. The stirring is continued for an hour after the addition is complete. A solution of 208 g. of sodium bisulfite in 350 cc. of water is then added slowly over a period of fifteen minutes, the temperature still being maintained below 20° C., following which the mixture is stirred for another hour, made acidic to Congo red with 500 cc. of conc. hydrochloric acid, and allowed to stand at room temperature overnight. The mixture is evaporated to dryness on a steam bath under diminished pressure, the residue extracted with 600 cc. of acetone, and the undissolved salts washed with an additional 200 cc. of acetone. The combined acetone extractions are concentrated on a steam bath and the residue distilled under reduced pressure. After a small forerun consisting mainly of water, the racemic $\alpha$-hydroxy-$\beta,\beta$-dimethyl-$\gamma$-butyrolactone is collected at 120–128° C. (14 mm.).

The racemic $\alpha$-hydroxy-$\beta,\beta$-dimethyl-$\gamma$-butyrolactone may be converted into salts of $\alpha,\gamma$-dihydroxy-$\beta,\beta$-dimethylbutyric acid as set forth in our co-pending application, Serial No. 442,537, filed May 11, 1942 and may be converted into pantothenic acid compounds as set forth in our pending application, Serial No. 407,358.

What we claim as our invention is:

1. In a process for preparing racemic $\alpha$-hydroxy-$\beta,\beta$-dimethyl-$\gamma$-butyrolactone, the procedure which comprises condensing substantially one molecular equivalent of formaldehyde with one of isobutyraldehyde in the presence of substantially one equivalent of aqueous alkaline water-soluble cyanide, treating the reaction mixture thereby obtained with water-soluble bisulfite to convert the formoisobutyraldol in the reaction mixture to its cyanhydrin and hydrolyzing and lactonizing said cyanhydrin by treating the reaction mixture with strong mineral acid.

2. In a process for preparing racemic $\alpha$-hydroxy-$\beta,\beta$-dimethyl-$\gamma$-butyrolactone, the procedure which comprises condensing substantially one molecular equivalent of formaldehyde with one of isobutyraldehyde in the presence of substantialy one equivalent of a strong aqueous solution of an alkali metal cyanide, treating the reaction mixture thereby obtained with alkali metal bisulfite to convert the formoisobutyraldol in the reaction mixture to its cyanhydrin and hydrolyzing and lactonizing said cyanhydrin by treating the reaction mixture with an excess of strong mineral acid.

3. The process for preparing racemic $\alpha$-hydroxy-$\beta,\beta$-dimethyl-$\gamma$-butyrolactone which comprises condensing substantially one molecular equivalent of formaldehyde with one of isobutyraldehyde in the presence of substantially one equivalent of aqueous alkaline water-soluble cyanide, treating the reaction mixture thereby obtained with water-soluble bisulfite to convert the formoisobutyraldol in the reaction mixture to its cyanhydrin, hydrolyzing and lactonizing said cyanhydrin by treating the reaction mixture with strong mineral acid, evaporating the resulting solution to substantial dryness, extracting the residue with acetone, distilling the extract, and collecting a distillation fraction having a boiling point of 120–128° C. at 14 mm. pressure thereby obtaining α-hydroxy-$\beta,\beta$-dimethyl-$\gamma$-butyrolactone.

ELMER J. LAWSON.
HERVEY C. PARKE.